Feb. 2, 1971 H. C. FLINT 3,560,048
SUSPENSION SAFETY SEAT
Filed Dec. 5, 1968 3 Sheets-Sheet 1

INVENTOR.
Hyland C. Flint
BY
Barnard, McGlynn & Reising
ATTORNEYS

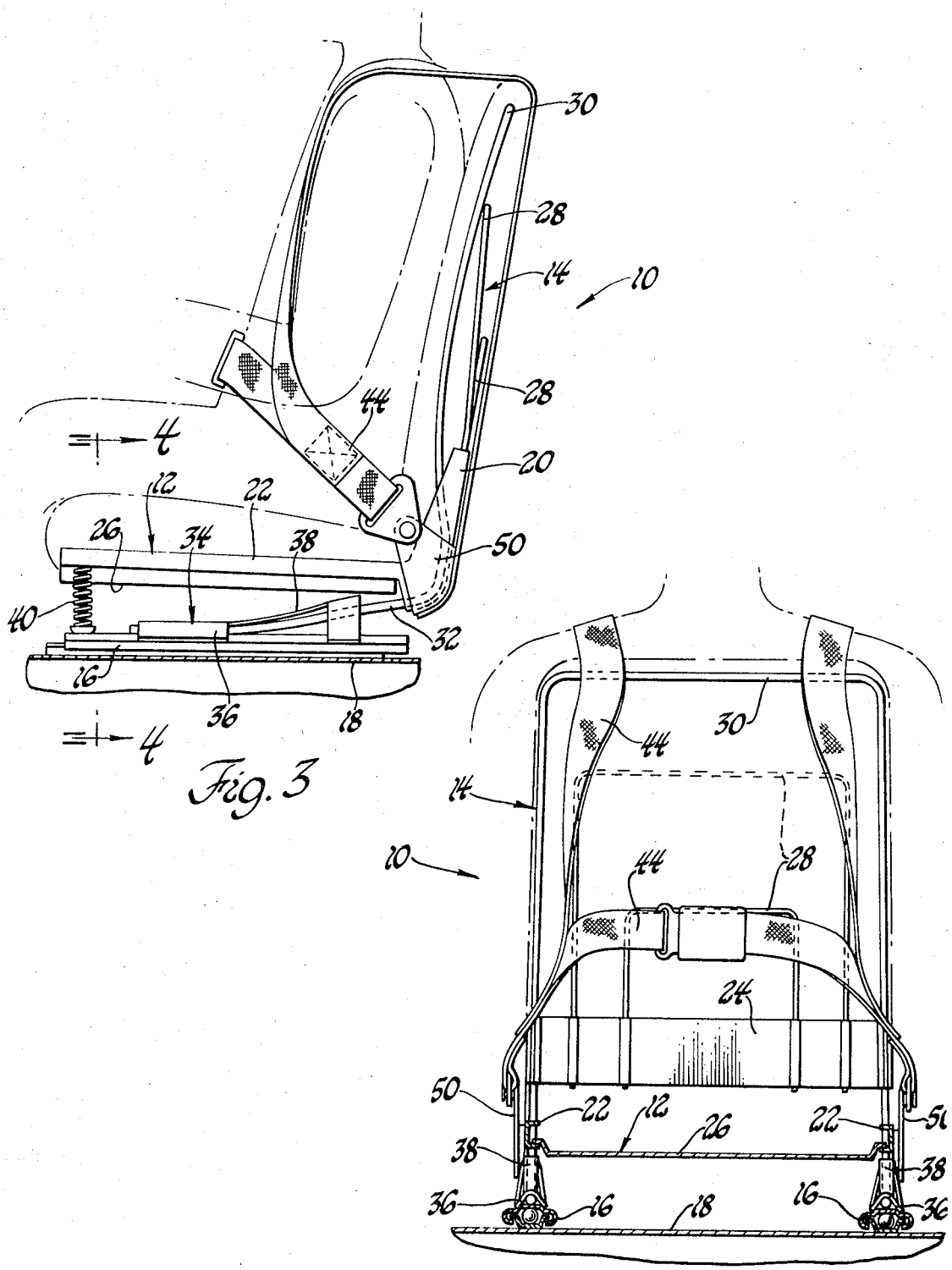

United States Patent Office 3,560,048
Patented Feb. 2, 1971

3,560,048
SUSPENSION SAFETY SEAT
Hyland C. Flint, 3551 Walnut Lake Road,
Orchard Lake, Mich. 48033
Filed Dec. 5, 1968, Ser. No. 781,406
Int. Cl. A62b 35/60
U.S. Cl. 297—389                            9 Claims

ABSTRACT OF THE DISCLOSURE

A seat assembly of the type utilized in vehicles including a seat portion and a back portion with a restraining means such as a seat belt, vest, or the like, attached to the seat portion or back portion for retaining a person in the seat assembly. A pair of flexible wire-like elements are connected to a base and extend rearwardly and upwardly therefrom to support the seat and back portion. These flexible elements allow the seat and back portions to move forwardly with a person retained in the seat and members coact with these flexible elements to progressively engage the flexible elements as the seat and back portions move forwardly to reduce the flexibility of the flexible elements.

---

This invention relates to a seat assembly of the type utilized in vehicles such as airplanes, automobiles, and the like.

A lap-type safety belt is normally utilized with such seat assemblies when installed in a vehicle. The end of such seat belts are anchored to a fixed structure such as the floor of the vehicle or to a solid portion of the seat which is in turn held immovable relative to the floor of the vehicle. These safety belts are meant to retain a person in the seat assembly in the event of a collision or crash. The problem with such assemblies is that, because they are anchored to an immovable member, the person occupying the seat is not allowed to move forward while being decelerated and while energy is dissipated. Instead, at least the portions of the person over which such safety belts extend are subjected to a very sudden stop.

In order to alleviate this problem there have been developed energy dissipating devices which may be attached to the anchored end of the seat belt to allow the occupant of the seat to move forward or which are attached to the seat itself to allow the seat to move forward in the event of a crash or collision. These assemblies, however, have not proven entirely satisfactory, some of the deficiencies being that they are fairly complex, subject to malfunction, and are expensive.

Accordingly, it is an object and feature of this invention to provide a seat assembly including a restraining means as a part thereof and with the structure of the assembly in and of itself being flexible to allow a person restrained in the seat to move forward while being decelerated in the event of a collision or crash.

In correlation with the foregoing object and feature, it is another object and feature of this invention to provide a seat assembly including a frame means defining a seat portion and a back portion and restraining means for retaining a person in the seat assembly with at least a portion of the frame means being flexible for allowing the restraining means to move forward with a person retained in the seat assembly.

In correlation with the foregoing objects and features, it is another object and feature of this invention to provide a seat assembly including a base with the frame means defining a forwardly extending seat portion and back portion adjacent the rear of the seat portion with flexible support means connected to the base and supporting the seat and back portions for allowing these portions to move forwardly relative to the base.

In correlation with the foregoing objects and features, it is another object and feature of this invention to provide such a seat assembly with control means for progressively reducing the flexibility of the support means in a forward direction as the seat and back portions move forward through a predetermined range.

Along with the foregoing objects and features, it is another object and feature of this invention to provide a seat assembly including a back portion which is flexible and a restraint means cooperable with the back portion whereby the back portion flexes forwardly with a person retained in the seat assembly in the event of a collision or crash.

Other objects and attendant advantages of the present invention will be readily appreciated as the same becomes better understood by reference to the following detailed description when considered in connection with the accompanying drawings wherein:

FIG. 3 is a side elevation of an embodiment of the invention utilizing a seat belt with shoulder straps as a restraint means;

FIG. 4 is a cross sectional view taken substantially along line 4—4 of FIG. 3.

Figures 1, 2:
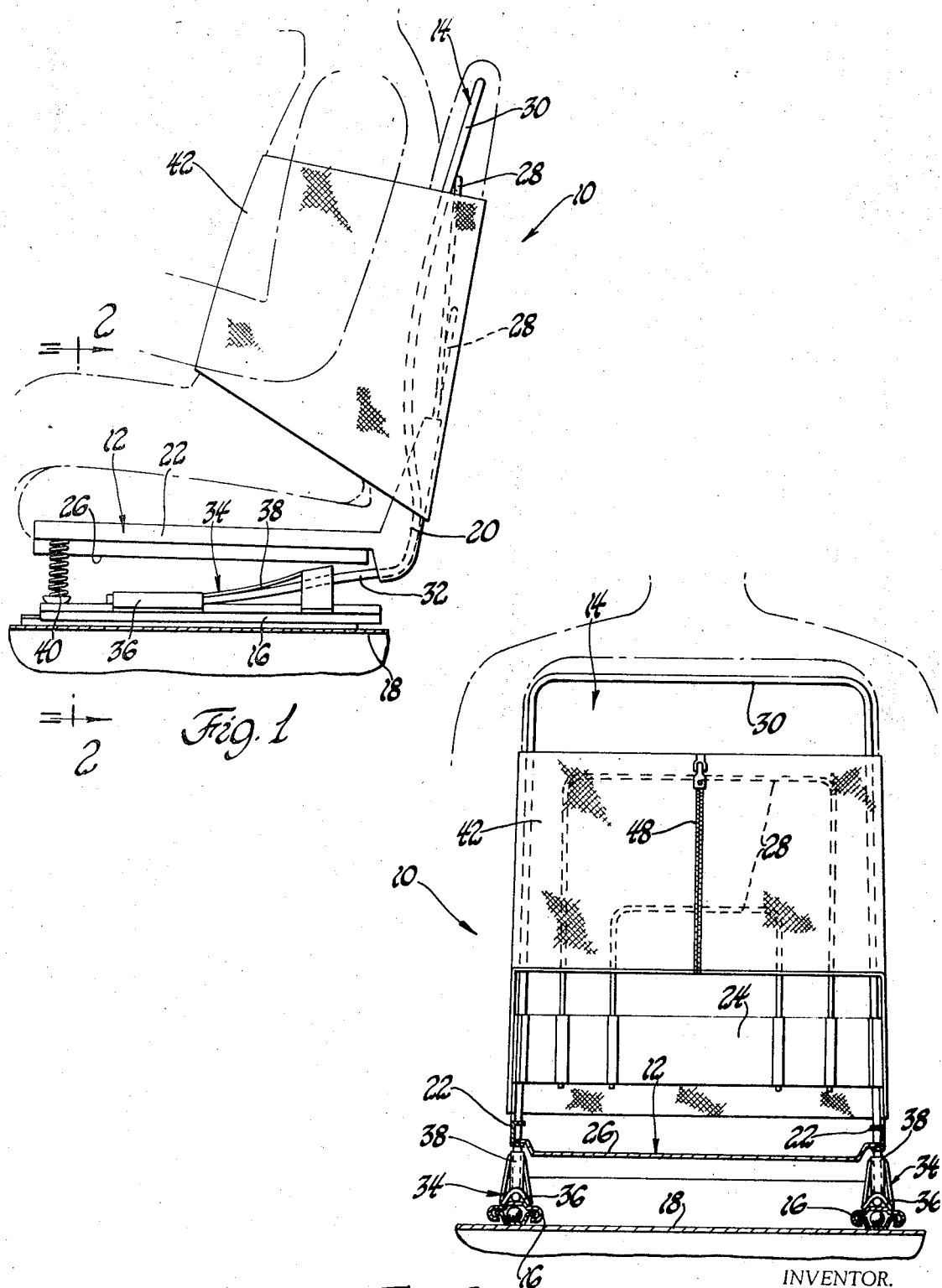
FIG. 1 is a side elevational view of an embodiment of the invention utilizing a vest-like device as a restraint means.
FIG. 2 is a cross sectional view taken substantially along line 2—2 of FIG. 1.

Referring now to the drawings, wherein like numerals indicate like or corresponding parts throughout the several views, a seat assembly constructed in accordance with the instant invention is generally shown at 10 in all of the views. The seat assembly 10 in the various embodiments is substantially the same and the various embodiments differ only in the restraint means utilized to retain an occupant or person in the seat assembly; therefore, the description shall proceed with reference to all of the embodiments and will culminate with a specific description of the various restraint means utilized.

The seat assembly 10 is of the type utilized in vehicles and includes a frame means defining a seat portion, generally indicated at 12, and a back portion, generally indicated at 14. The seat assembly 10 also includes a base comprising the track assemblies 16. The track assemblies 16 are of the type well known in the art and provide fore and aft horizontal positioning. The track assemblies 16 are secured to a support structure such as the floor 18 of a vehicle.

The seat portion 12 extends forwardly and the back portion 14 is disposed adjacent the rear of the seat portion 12 and extends upwardly therefrom. The seat portion 12 includes the integral member 20 having the forwardly extending channels 22 and the rear cross plate 24. Suspended between the forwardly extending channel members 22 is the support pan 26. The forwardly extending channels 22 and the support pan 26 receive and support a cushion assembly of the type well known in the prior art and shown in phantom in the various views.

The back portion 14 is flexible in the fore and aft direction and comprises a plurality of U-shaped flexible members 28 and 30 spaced one within the other. The flexible U-shaped members 28 are attached to the cross plate 24.

The frame means includes flexible support means comprising the flexible elements 32 connected to the track 16 of the base and supporting the seat and back portions 12 and 14 for allowing the latter to move forward relative to the track assemblies 16 of the base. The flexible elements 32 extend upwardly and rearwardly from the track assemblies 16 of the base. The flexible elements 32 are actually, as illustrated, integrally connected together through the U-shaped member 30, i.e., the outer U-shaped flexible member 30 is integral with the flexible elements 32. The member 20 is secured as by welding or the like to the integral members 30–32. There is included a control means comprising the member generally indicated at 34 for controlling the flexibility of the flexible elements 32 in a forward direction and includes a channel portion 36 for securing the flexible elements 32 to the respective track assemblies 16. The members 34 comprise control means cooperable with the flexible elements 32 for progressively reducing the flexibility thereof in a forward and upward direction as the seat and back portions 12 and 14 move forwardly through a predetermined range. The members 34 are disposed over the flexible elements 32 and engage the elements 32 at the forward ends thereof, as indicated at 32, to retain the elements to the track assemblies 16 of the base. The members 34 are spaced from the flexible elements 32 an increasing amount in the rearward direction from the forward ends along the flat sections indicated at 38 so that the flexible elements 32 progressively contact the members 34 as the seat and back portions 12 and 14 move forward. As illustrated, the flat sections 38 of the members 34 are arcuately curved rearwardly and upwardly so that the distance between the sections 38 and the flexible elements 32 increases in a rearward direction. Thus, as the elements 32 move forwardly they progressively contact the flat sections 38.

There is also included a spring means comprising the coil springs 40 reacting between the seat portion 12 and the track assemblies 16 of the base adjacent the forward ends of the seat portion 12. These springs cushion downward movement of the seat portion 12.

Figure 5:
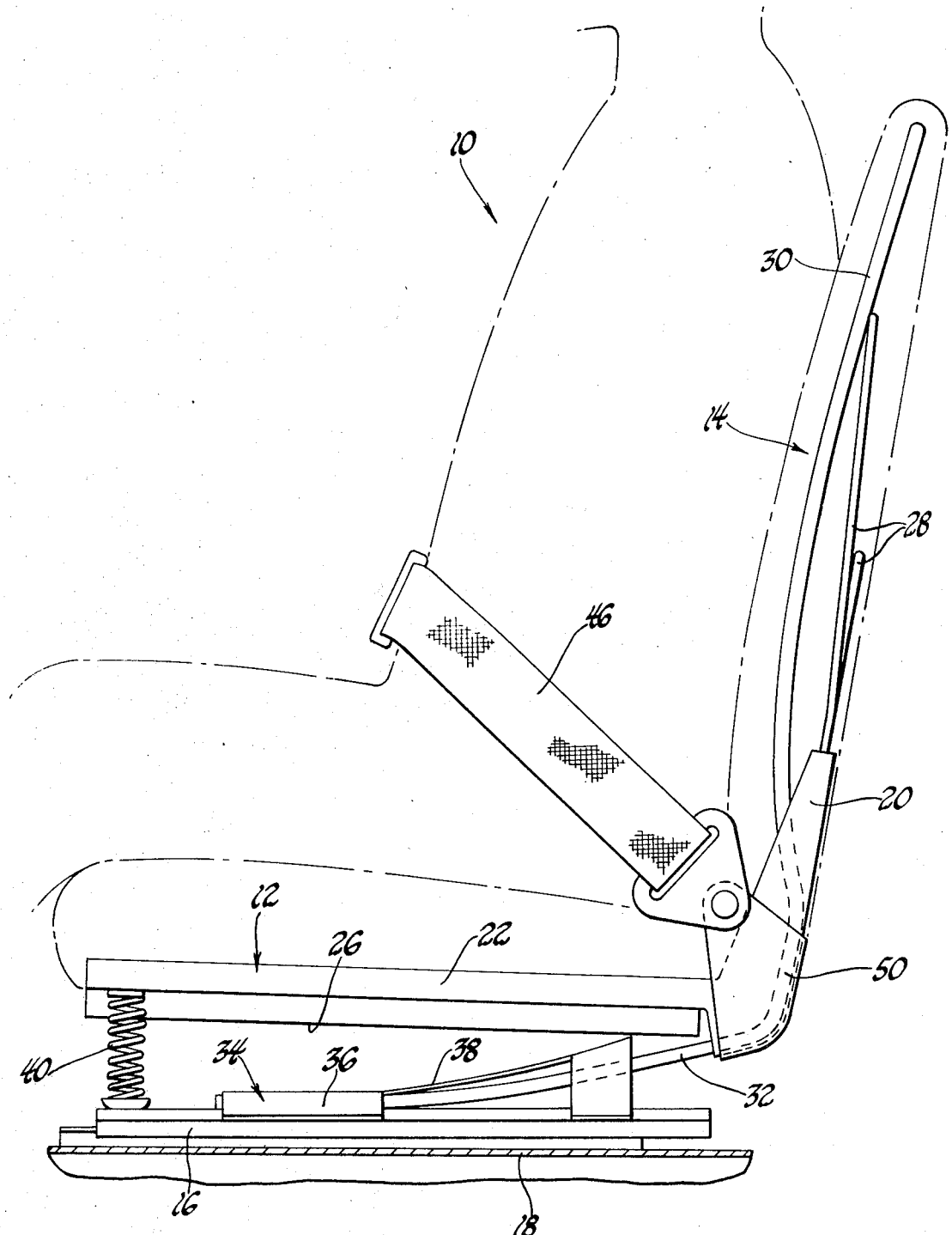
FIG. 5 is a side elevational view of an embodiment utilizing a safety belt as a restraint means.

There is also included restraining means attached to the frame means for retaining a person or occupant in the seat assembly and which is shown at 42 in FIGS. 1 and 2, at 44 in FIGS. 3 and 4, and at 46 in FIG. 5.

As alluded to hereabove, the back portion 14 comprising the U-shaped members disposed one within the other is itself flexible, i.e., the back portion 14 is flexible forwardly and rearwardly independently of movement of the flexible elements 32. In the embodiment of FIGS. 1 and 2 the restraint means comprises a vest-like device 42 which is connected to the back portion 14 and adapted to extend about the chest of a person or occupant in the seat assembly. The occupant may seat himself in the assembly and connect the two halves of vest-like device 42 by engaging the zipper 48. Thus, in the event of a crash of a vehicle utilizing the seat asembly of FIGS. 1 and 2, the occupant will be retained in the seat assembly by the vest-like device 42 and the back portion 14 will flex forwardly and the flexible elements 32 will move upwardly and forwardly to progressively engage the flat sections 38 of the members 34 which reduces the flexibility of the elements 32 in proportion to the forward movement thereof, thus, decelerating forward movement of the occupant.

In the embodiments of FIGS. 3, 4 and 5 there is included brackets 50 which are secured to the member 20 as by welding or the like. In the embodiment of FIGS. 3 and 4, the restraint means comprises a seat belt connected to the brackets 50 adjacent the rearward and upward extremities of the flexible elements 32. The seat belt extends across the lap of the person or occupant in the seat assembly. There is also included shoulder straps which are disposed over the back portion 14 and are connected to the cross plate 24 of the frame means.

The embodiment of FIG. 5 is identical to the embodiment of FIGS. 3 and 4 except that shoulder straps are not utilized in combination with the safety belt extending across the lap.

The embodiments of the invention in which an exclusive property or privilege is claimed are defined as follows:

1. A seat assembly of the type utilized in vehicles and comprising: a base, frame means defining a forwardly extending seat portion and a back portion disposed adjacent the rear of said seat portion, restraining means attached to said frame means for retaining a person in the seat assembly, said frame means including flexible support means connected to said base and supporting said seat and back portions for allowing the latter to move forward relative to said base, said support means including flexible elements extending upwardly and rearwardly from the base, and control means including a flexible member disposed over each of the flexible elements and engaging said elements at the forward ends thereof and being spaced therefrom an increasing amount in the rearward direction from said forward ends so that said flexible elements progressively contact said control means as said seat and back portions move forward.

2. An assembly as set forth in claim 1 wherein said back portion is itself flexible, said restraint means being cooperable with said back portion whereby said back portion flexes forwardly with a person retained in the seat assembly.

3. An assembly as set forth in claim 2 wherein said back portion includes a plurality of U-shaped flexible members spaced one within the other and with the outer one being integral with said flexible elements.

4. An assembly as set forth in claim 2 wherein said restrain means comprises a vest-like device connected to said back portion and adapted to extend about the chest of a person in the seat assembly.

5. An assembly as set forth in claim 2 wherein said restraint means comprises a seat belt connected to said frame means adjacent the rearward and upward extremities of said flexible elements and adapted to extend across the lap of a person in the seat assembly, said seat belt includes the shoulder straps disposed over said back portion and connected to said frame means.

6. An assembly as set forth in claim 3 including control means cooperable with said flexible elements for progressively reducing the flexibility thereof in a forward and upward direction as said seat and back portions move forward through a predetermined range.

7. An assembly as set forth in claim 6 wherein said control means includes a member disposed over each of said flexible elements and engaging said elements at the forward ends thereof and being spaced therefrom an increasing amount in the rearward direction from said forward ends so that said flexible elements progressively contact said control means as said seat and back portions move forward.

8. An assembly as set forth in claim 7 wherein said support means includes spring means reacting between said seat portion and said base adjacent the forward end of said seat portion.

9. A seat assembly for vehicles comprising: a seat portion and a back portion, frame means for the back portion including an elastically resilient member for permitting elastic displacement of the back portion in the fore-and-aft direction under load, restraining means for securing an occupant to the back portion, and control means operatively connected to the resilient member for progressively increasing the spring rate of the resilient member throughout the range of elastic displacement of the back portion in the fore-and-aft direction.

References Cited

UNITED STATES PATENTS

| | | | |
|---|---|---|---|
| 2,366,730 | 1/1945 | Hickman | 297—285 |
| 3,321,246 | 5/1967 | Davies | 297—389 |
| 3,321,247 | 5/1967 | Dillender | 297—389 |
| 3,372,955 | 3/1968 | Flint | 297—300 |

FOREIGN PATENTS 555,246  4/1968  Canada _____ 297—216

OTHER REFERENCES

German printed application; 1,130,717 Schwenk; May 1962.

JAMES T. McCALL, Primary Examiner

U.S. Cl. X.R.

297—300, 385